United States Patent [19]
Morita et al.

[11] Patent Number: 5,158,915
[45] Date of Patent: Oct. 27, 1992

[54] MAGNESIA-BASED SINTERED BODY AND PROCESS FOR PREPARING SAME

[75] Inventors: Mitsuhiko Morita; Yoshio Yoshimoto; Tatsuhiko Matsumoto, all of Ube, Japan

[73] Assignee: UBE Industries, Ltd., Yamaguchi, Japan

[21] Appl. No.: 642,447

[22] Filed: Jan. 17, 1991

[30] Foreign Application Priority Data

Jan. 19, 1990 [JP] Japan ............... 2-8129

[51] Int. Cl.$^5$ ............... C04B 35/04
[52] U.S. Cl. ............... 501/108; 501/111; 501/112; 501/119
[58] Field of Search ............... 501/108, 111, 112, 119, 501/121

[56] References Cited

U.S. PATENT DOCUMENTS 3,231,402  1/1966  Leatham ............... 501/121

FOREIGN PATENT DOCUMENTS 62-122106 10/1986 Japan .
264403  7/1990 Japan .
14083  3/1982 U.S.S.R. ............... 501/108

Primary Examiner—William R. Dixon, Jr.
Assistant Examiner—C. M. Bonner
Attorney, Agent, or Firm—Finnegan, Henderson, Farabow, Garrett & Dunner

[57] ABSTRACT

A magnesia-based sintered body of a homogeneous composition having a porosity lower than 1% and a hydrateability lower than 0.3%, said sintered body having a chemical composition comprising 70 to 99.9% by weight of magnesia and 30 to 0.1% by weight of at least one oxide selected from the group consisting of titanium oxide, aluminum oxide, ferric oxide, phosphorus pentoxide, yttrium oxide, barium oxide, boron oxide, calcium oxide and lithium oxide. The sintered body is obtained by molding a powdery mixture of magnesia and the oxide other than magnesia.

5 Claims, 2 Drawing Sheets

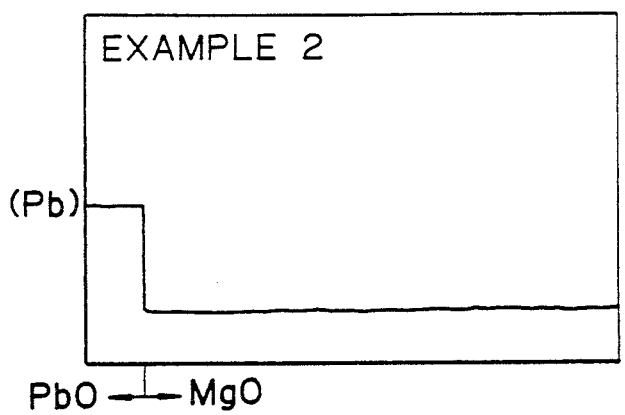
Fig. 1A LINE ANALYSIS
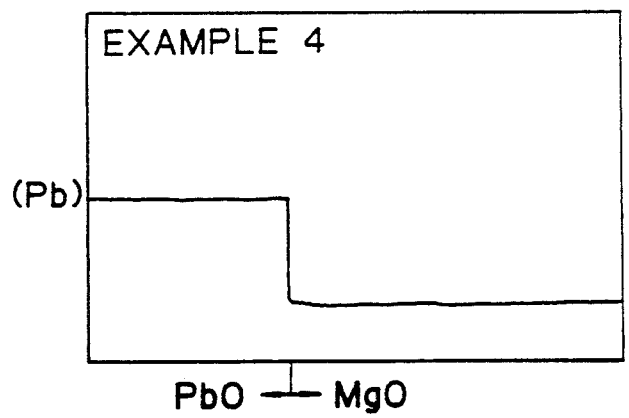
Fig. 1B LINE ANALYSIS
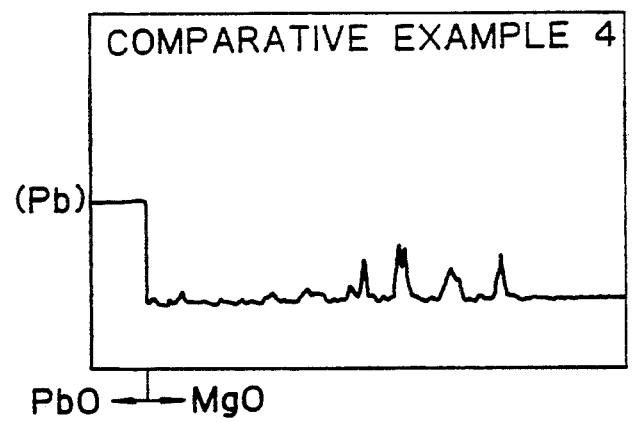
Fig. 1C LINE ANALYSIS
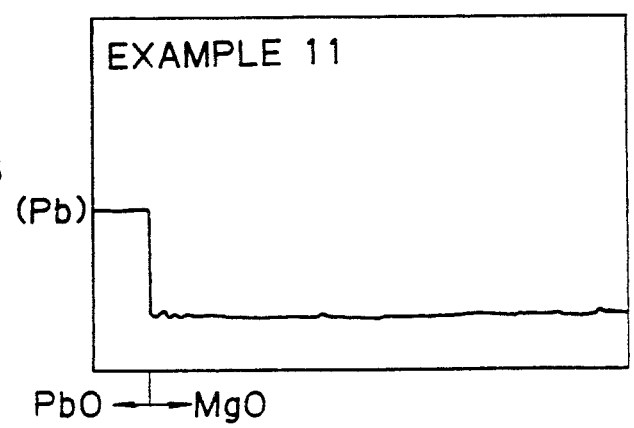
Fig. 1D LINE ANALYSIS

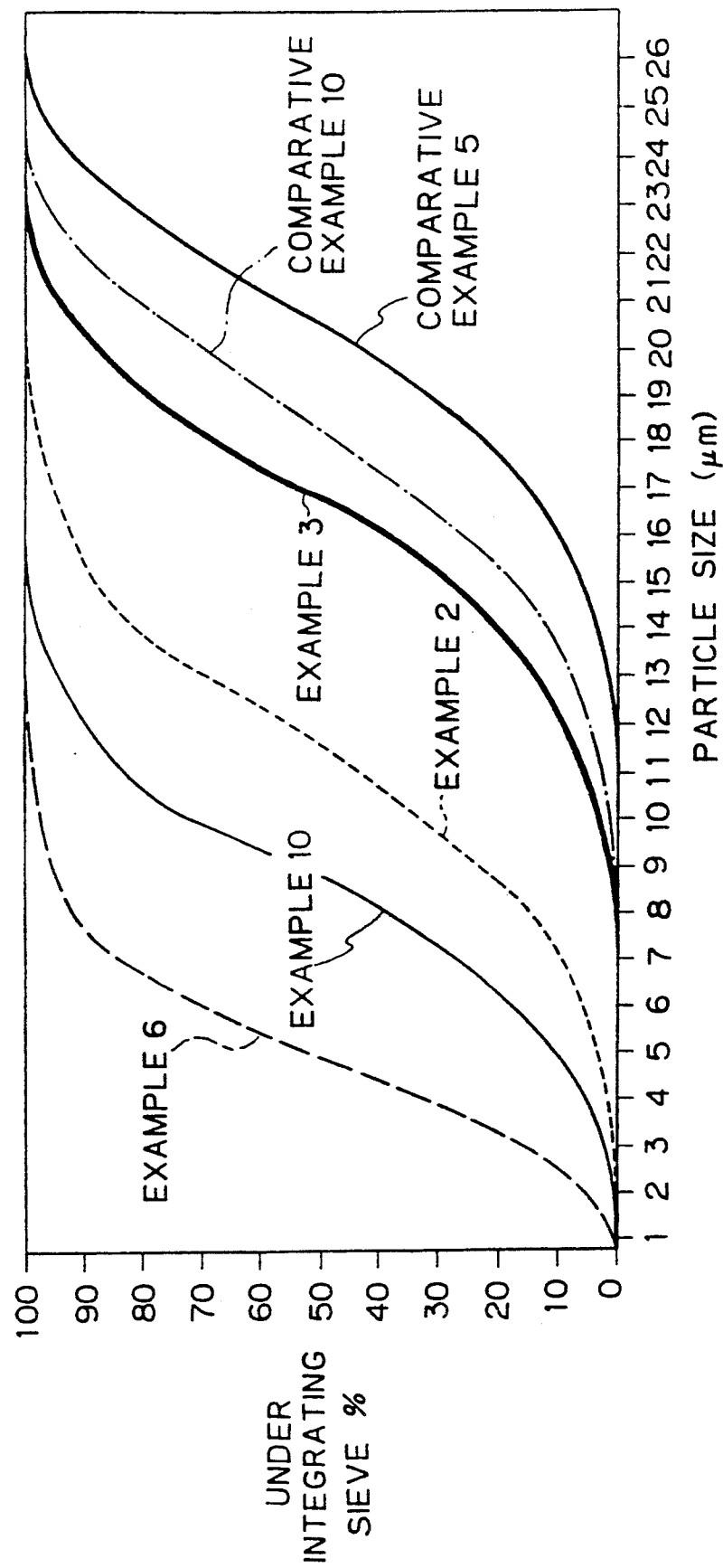

MAGNESIA-BASED SINTERED BODY AND PROCESS FOR PREPARING SAME

BACKGROUND OF THE INVENTION (1) Field of the Invention

The present invention relates to a magnesia-based sintered body having a high density and excellent mechanical characteristics, and a process for the preparation thereof. More particularly, the present invention relates to a magnesia-based sintered body having a dense texture, a high hydration resistance and a high corrosion resistance, and a process for the preparation thereof.

(2) Description of the Related Art

Magnesia has a melting point as high as 2800° C. and has an excellent corrosion resistance against an alkali metal or basic slag, and accordingly, it is thought that magnesia can be effectively used as a heat-resistant material for an alkali metal-melting crucible and the like. Magnesia, however, has an extremely poor hydration resistance, and further, a high-density magnesia sintered body generally used is often prepared by using a magnesia powder formed by thermal decomposition of a magnesium salt such as magnesium hydroxide or basic magnesium carbonate as the starting magnesia powder. This magnesia powder is difficult to sinter, and thus it is necessary to include various additives as the sintering aid at the sintering step. Moreover, in the magnesia powder formed by the thermal decomposition method, agglomerated particles are formed because of the remaining skeleton of the mother salt, and since these agglomerated particles remain even after mixing with the additive powder, a mixing at a level of primary particles is impossible, and thus the additive must be included in an amount much larger than the necessary amount.

As the means for overcoming these disadvantages, there has been proposed a method for obtaining a magnesia-based sintered body having a high hydration resistance and improved mechanical properties by adding magnesium phosphate, silica, zirconia or the like to the starting magnesia powder, but in the magnesia-based sintered body obtained according to the above-mentioned method, since the substance added is not uniformly present, an abnormal growth of particles occurs, and good results cannot be obtained with regard to the hydration resistance and corrosion resistance.

SUMMARY OF THE INVENTION

An object of the present invention is to provide a magnesia-based sintered body having a dense structure, a high hydration resistance, and a high corrosion resistance.

According to the present invention, this object can be attained by a magnesia-based sintered body of a homogeneous composition having a porosity lower than 1% and a hydrateability lower than 0.3%, said sintered body having a chemical composition comprising 70 to 99.9% by weight of magnesia and 30 to 0.1% by weight of at least one oxide selected from the group consisting of titanium oxide, aluminum oxide, ferric oxide, phosphorus pentoxide, yttrium oxide, barium oxide, boron oxide, calcium oxide and lithium oxide.

This magnesia-based sintered body contains the above-mentioned oxide in the form of a solid solution of the oxide and magnesia, independent particles having a particle size smaller than 3 μm or a reaction product of the oxide with magnesia.

BRIEF DESCRIPTION OF THE DRAWINGS

FIGS. 1A through 1D are diagrams showing results of the corrosion resistance test (observation by XMA), obtained in Example 2, Example 4, Comparative Example 4 and Example 11, respectively; and, FIG. 2 shows the particle size distributions of magnesia-based sintered bodies obtained in Examples 2, 3, 6 and 10 and Comparative Examples 2 and 5.

DESCRIPTION OF THE PREFERRED EMBODIMENTS

Preferably, the magnesia powder used for the preparation of the magnesia-based sintered body of the present invention is prepared according to the process disclosed in Japanese Unexamined Patent Publication No. 61-122106. According to this process, a magnesia powder is prepared by a gas-phase reaction between a vapor of magnesium and an oxygen-containing gas. The magnesia powder obtained according to this process is composed of isometric primary particles and is characterized in that the agglomeration thereof is very small, and accordingly, the powder can be mixed at a level of primary particles with an additive powder. A small amount of the additive is sufficient, and compared with the case of an ordinary magnesia powder, the additive shows a similar effect with a much smaller amount.

The magnesia-based sintered body of the present invention is prepared by molding a powdery mixture comprising 70 to 99.9 parts by weight of a magnesia powder prepared according to the process disclosed in Japanese Unexamined Patent Publication No. 61-122106, which has a purity higher than 99.9% and an average particle size smaller than 0.5 μm, and 30 to 0.1 parts by weight of a powder of at least one oxide selected from the group consisting of titanium oxide, aluminum oxide, ferric oxide, phosphorus pentoxide, yttrium oxide, barium oxide, boron oxide, calcium oxide and lithium oxide, which has a purity higher than 99.9% and an average particle size smaller than 3 μm and especially an average particle size smaller than 1 μm and sintering the molded body at a temperature of 1400° to 1900° C. The obtained magnesia-based sintered body has a high density and a high hydration resistance, and since the amount added of the oxide is small, the corrosion resistance of the magnesia-based sintered body is not reduced. Further, since an abnormal growth of particles is not substantially observed, it is considered that the composition of the magnesia-based sintered body including pores is uniform, and therefore, the corrosion resistance and impact resistance are good.

The magnesia-based sintered body of the present invention contains the above-mentioned oxide in the form of a solid solution of the oxide and magnesia, independent particles having a particle size smaller than 3 μm or a reaction product of the oxide with magnesia. The ratio of the contained oxide is 0.1 to 30% by weight to 99.9 to 70% by weight of magnesia. Preferably, the ratio of contained titanium oxide is 0.1 to 30% by weight, the ratio of contained aluminum oxide is 0.1 to 1% by weight, the ratio of contained ferric oxide is 0.1 to 10% by weight, the ratio of contained phosphorus pentoxide is 1 to 5% by weight, the ratio of contained yttrium oxide is 1 to 30% by weight, the ratio of contained barium oxide is 1 to 10% by weight, the ratio of contained boron oxide is 10 to 20% by weight, the ratio of contained calcium oxide is 1 to 10% by weight and the ratio of contained lithium oxide is 10 to 15% by weight, each ratio being based on 99.9 to 70% by weight of magnesia. If the amount of the contained oxide is smaller than 0.1% by weight, the porosity of the magnesia-based sintered body is more than 1%. If the amount of the contained oxide is larger than 30% by weight, an abnormal growth of particles readily occurs in the magnesia-based sintered body and a uniform composition cannot be obtained.

As apparent from the foregoing description, the magnesia-based sintered body of the present invention has a porosity lower than 1% and a hydrateability lower than 0.3%, and has a uniform composition without abnormal growth of particles. Accordingly, the sintered body has a high corrosion resistance to an alkali metal and the like and a high mechanical strength. Therefore, the magnesia-based sintered body of the present invention is extremely useful as a material for sintering β-alumina, sintering PZT/PLZT, melting a high-melting-point high-purity metal, heat-treating a superconductive material, sintering a superconductor, and forming a thin film of a superconductive material.

The results of the measurement of the porosity, hydration resistance, and corrosion resistance of the magnesia-based sintered body of the present invention will now be described.

The porosity is determined according to Archimedes' Laws

True volume $Vr$ of sintered body $= Wr/\rho$
Volume $Vc$ of closed pores $= (Wr - W1)/\rho h - Vr$
Volume $Vo$ of open pores $= (W2 - Wr)/\rho h$
Relative density $d = Vr/(Vr + Vc + Vo)$
Porosity $D = 1 - d$ In the above formulae, $Wr$ represents the absolute dry weight, i.e., the weight of the sintered body in air, $W1$ represents the weight in water, i.e., the weight in water of the sintered body in which water intrudes in open pores, $W2$ represents the surface-dry weight, i.e., the weight of the sintered body which has been placed in water, after removal of only water present on the surface, $\rho h$ represents the specific gravity of water at the measurement temperature, and $\rho$ represents the theoretical density of the sample.

The magnesia-based sintered body is boiled in distilled water for 24 hours, and the hydrateability is evaluated based on the increase of the weight by the boiling. The larger the value of the hydrateability shown in Table 1, i.e., the larger the value of the weight increase, the poorer the hydration resistance, because magnesia is readily hydrated and converted to magnesium hydroxide.

At the corrosion resistance test, the magnesia-based sintered body is maintained at 900° C. in melted lead oxide for 1 hour, and after cooling, the sintered body is taken out. The fracture face of the magnesia-based sintered body is used as the sample and the degree of intrusion of lead oxide in the magnesia-based sintered body is determined by the XMA observation. FIG. 1 shows the obtained results, and each diagram illustrates the presence of lead oxide in the boundary between lead oxide and the magnesia-based sintered body. Namely, where there is no intrusion of lead oxide in the magnesia-based sintered body, no peak is found on the base line, and if lead oxide intrudes in the magnesia-based sintered body, a peak is found on the base line.

EXAMPLES 1 THROUGH 12

Predetermined amounts of a magnesia powder obtained by the gas phase method, which had a purity higher than 99.9% and an average particle size of 0.1 μm, and an additive shown in Table 1, which had a purity higher than 99.9% and an average particle size smaller than 1 μm, were mixed for 30 minutes by ultrasonic waves in ethanol as the solvent. Then, the ethanol was removed to obtain a powdery mixture, and about 200 mg of the powdery mixture was filled in a mold having a diameter of 10 mm and monoaxially compressed and molded under a pressure of 1.5 t/cm². The obtained molded body was sintered at 1500° C. for 1 hour to obtain a magnesia-based sintered body, and the porosity, hydrateability and corrosion resistance of the magnesia-based sintered body were measured. The results of the measurement of the hydrateability are shown in Table 1. In each sample, the weight increase ratio was about 0.1 to about 0.2%, and each sample showed a good dehydration resistance. The results of the measurement of the corrosion resistance are shown in FIG. 1. No intrusion of lead oxide in the magnesia-sintered body was observed.

The particle size distributions of the magnesia-based sintered body particles obtained in Examples 2, 6, 3 and 10 are shown in Tables 2 through 5 and FIG. 2.

Each particle size distribution was sharp, and it is seen that the magnesia-based sintered bodies had a uniform composition.

TABLE 1

| Example No. | Additive | Presence Ratio (%) MgO | Presence Ratio (%) Additive | Porosity (%) | Hydrateability (%) |
|---|---|---|---|---|---|
| 1 | titania | 99.0 | 1.0 | 1.0 | 0.10 |
| 2 | alumina | 99.9 | 0.1 | 0.9 | 0.21 |
| 3 | ferric oxide | 99.0 | 1.0 | 0.4 | 0.10 |
| 4 | phosphorus pentoxide | 99.0 | 1.0 | 1.0 | 0.10 |
| 5 | yttria | 90.0 | 10.0 | 0.5 | 0.18 |
| 6 | barium oxide | 99.0 | 1.0 | 0.6 | 0.18 |
| 7 | titania + beryllium oxide | 99.0 | 0.5 0.5 | 0.9 | 0.22 |
| 8 | titania | 70.0 | 30.0 | 0.8 | 0.20 |
| 9 | yttria | 70.0 | 30.0 | 0.6 | 0.18 |
| 10 | boron oxide | 90.0 | 10.0 | 1.0 | 0.20 |
| 11 | calcium oxide | 90.0 | 10.0 | 0.5 | 0.11 |
| 12 | lithium oxide | 85.0 | 15.0 | 0.8 | 0.17 |
| Comparative Example No. | | | | | |
| 1 | titania | 99.0 | 1.0 | 0.9 | 0.21 |
| 2 | ferric oxide | 99.0 | 1.0 | 1.0 | disintegration |
| 3 | not added | 100.0 | — | 1.0 | 1.50 |
| 4 | ferric oxide | 99.0 | 1.0 | 0.4 | 2.11 |
| 5 | titania | 70.0 | 30.0 | 1.0 | 2.52 |
| 6 | calcium oxide | 90.0 | 10.0 | 1.5 | disintegration |
| 7 | lithium oxide | 85.0 | 15.0 | 3.0 | 2.95 |

TABLE 2

(Example 2)
Additive: alumina

| Particle Size Range (μm) | Number | Particle Size Distribution | Cumulation |
|---|---|---|---|
| 0–1 | 0 | 0.0 | 0.0 |
| 1–2 | 2 | 0.5 | 0.5 |
| 2–3 | 0 | 0.0 | 0.5 |
| 3–4 | 4 | 1.0 | 1.5 |

TABLE 2-continued (Example 2)
Additive: alumina

| Particle Size Range (μm) | Number | Particle Size Distribution | Cumulation |
|---|---|---|---|
| 4-5 | 3 | 0.8 | 2.3 |
| 5-6 | 10 | 2.6 | 4.9 |
| 6-7 | 15 | 3.8 | 8.7 |
| 7-8 | 21 | 5.4 | 14.1 |
| 8-9 | 40 | 10.3 | 24.4 |
| 9-10 | 35 | 9.0 | 33.3 |
| 10-11 | 45 | 11.5 | 44.9 |
| 11-12 | 40 | 10.3 | 55.1 |
| 12-13 | 61 | 15.6 | 70.8 |
| 13-14 | 45 | 11.5 | 82.3 |
| 14-15 | 26 | 6.7 | 89.0 |
| 15-16 | 14 | 3.6 | 92.6 |
| 16-17 | 15 | 3.8 | 96.4 |
| 17-18 | 6 | 1.5 | 97.9 |
| 18-19 | 6 | 1.5 | 99.5 |
| 19-20 | 2 | 0.5 | 100.0 |
|  | 390 |  |  |

Average particle size: 11.5 μm

TABLE 3

(Example 6)
Additive: barium oxide

| Particle Size Range (μm) | Number | Particle Size Distribution | Cumulation |
|---|---|---|---|
| 0-1 | 0 | 0.0 | 0.0 |
| 1-2 | 10 | 5.0 | 5.0 |
| 2-3 | 22 | 10.9 | 15.9 |
| 3-4 | 31 | 15.4 | 31.3 |
| 4-5 | 42 | 20.9 | 52.2 |
| 5-6 | 35 | 17.4 | 69.7 |
| 6-7 | 29 | 14.4 | 84.1 |
| 7-8 | 18 | 9.0 | 93.0 |
| 8-9 | 5 | 2.5 | 95.5 |
| 9-10 | 5 | 2.5 | 98.0 |
| 10-11 | 2 | 1.0 | 99.0 |
| 11-12 | 1 | 0.5 | 99.5 |
| 12-13 | 1 | 0.5 | 100.0 |

TABLE 3-continued (Example 6)
Additive: barium oxide

| Particle Size Range (μm) | Number | Particle Size Distribution | Cumulation |
|---|---|---|---|
| 13-14 | 0 | 0.0 | 100.0 |
| 14-15 | 0 | 0.0 | 100.0 |
| 15-16 | 0 | 0.0 | 100.0 |
| 16-17 | 0 | 0.0 | 100.0 |
| 17-18 | 0 | 0.0 | 100.0 |
| 18-19 | 0 | 0.0 | 100.0 |
| 19-20 | 0 | 0.0 | 100.0 |
|  | 201 |  |  |

Average particle size: 4.9 μm

TABLE 4

| | Example 3 Additive: ferric oxide | | | | Comparative Example 2 Additive: ferric oxide | | |
|---|---|---|---|---|---|---|---|
| Particle Size Range (μm) | Number | Particle Size Distribution | Cumulation | Particle Size Range (μm) | Number | Particle Size Distribution | Cumulation |
| 0-1 | 0 | 0.0 | 0.0 | 0-1 | 0 | 0.0 | 0.0 |
| 1-2 | 0 | 0.0 | 0.0 | 1-2 | 0 | 0.0 | 0.0 |
| 2-3 | 0 | 0.0 | 0.0 | 2-3 | 0 | 0.0 | 0.0 |
| 3-4 | 0 | 0.0 | 0.0 | 3-4 | 0 | 0.0 | 0.0 |
| 4-5 | 1 | 0.4 | 0.4 | 4-5 | 0 | 0.0 | 0.0 |
| 5-6 | 0 | 0.0 | 0.4 | 5-6 | 0 | 0.0 | 0.0 |
| 6-7 | 0 | 0.0 | 0.4 | 6-7 | 0 | 0.0 | 0.0 |
| 7-8 | 1 | 0.4 | 0.7 | 7-8 | 1 | 0.3 | 0.3 |
| 8-9 | 3 | 1.1 | 1.8 | 8-9 | 1 | 0.3 | 0.6 |
| 9-10 | 3 | 1.1 | 2.9 | 9-10 | 3 | 0.9 | 1.5 |
| 10-11 | 11 | 4.0 | 7.0 | 10-11 | 4 | 1.2 | 2.7 |
| 11-12 | 8 | 2.9 | 9.9 | 11-12 | 7 | 2.1 | 4.9 |
| 12-13 | 11 | 4.0 | 13.9 | 12-13 | 12 | 3.6 | 8.5 |
| 13-14 | 20 | 7.3 | 21.2 | 13-14 | 11 | 3.3 | 11.9 |
| 14-15 | 20 | 7.3 | 28.6 | 14-15 | 20 | 6.1 | 17.9 |
| 15-16 | 30 | 11.0 | 39.6 | 15-16 | 29 | 8.8 | 26.7 |
| 16-17 | 42 | 15.4 | 54.9 | 16-17 | 34 | 10.3 | 37.1 |
| 17-18 | 41 | 15.0 | 70.0 | 17-18 | 36 | 10.9 | 48.0 |
| 18-19 | 31 | 11.4 | 81.3 | 18-19 | 39 | 11.9 | 59.9 |
| 19-20 | 19 | 7.0 | 88.3 | 19-20 | 32 | 9.7 | 69.6 |
| 20-21 | 22 | 8.1 | 96.3 | 20-21 | 40 | 12.2 | 81.8 |
| 21-22 | 8 | 2.9 | 99.3 | 21-22 | 32 | 9.7 | 91.5 |
| 22-23 | 2 | 0.7 | 100.0 | 22-23 | 18 | 5.5 | 97.0 |
| 23-24 | 0 | 0.0 | 100.0 | 23-24 | 10 | 3.0 | 100.0 |
|  | 273 |  |  |  | 329 |  |  |

Average particle size: 15.4 μm | Average particle size: 18.2 μm

TABLE 5

(Example 10)
Additive: boron oxide

| Particle Size Range | Number | Particle Size Distribution | Cumulation |
|---|---|---|---|
| 1-2 | 2 | 0.5 | 0.5 |
| 2-3 | 5 | 1.6 | 2.1 |
| 3-4 | 12 | 3.6 | 5.7 |
| 4-5 | 17 | 5.2 | 10.9 |
| 5-6 | 25 | 7.5 | 18.4 |
| 6-7 | 27 | 8.1 | 26.5 |
| 7-8 | 42 | 12.9 | 39.4 |
| 8-9 | 49 | 14.8 | 54.2 |
| 9-10 | 72 | 21.9 | 76.1 |
| 10-11 | 26 | 7.8 | 83.9 |
| 11-12 | 23 | 7.0 | 90.9 |
| 12-13 | 15 | 4.5 | 95.4 |
| 13-14 | 13 | 4.0 | 99.4 |
| 14-15 | 2 | 0.6 | 100.0 |
|  | 330 |  |  |

Average particle size: 8.7 μm

COMPARATIVE EXAMPLE 1

A magnesia-based sintered body was prepared in the same manner as described in Example 1 except that a magnesia powder obtained by the gas phase process, which had a purity higher than 99.9% and an average particle size of 1 μm, was used. The results of the measurement of the hydrateability are shown in Table 1. The sintered body had a good hydration resistance comparable to those of the sintered bodies obtained in Examples 1 through 7.

The porosity was lower than 1%, but at the SEM observation, an abnormal growth of particles was confirmed, and the composition was uneven and the corrosion resistance poor. It is considered that this abnormal growth of particles was due to the large average particle size of the starting magnesia powder.

COMPARATIVE EXAMPLE 2

A magnesia-based sintered body was prepared in the same manner as described in Example 3 except that 99% of a magnesia powder obtained according to the gas phase process, which had a purity higher than 99.9% and an average particle size of 0.1 μm, was mixed with 1% of ferric oxide having a purity higher than 99.9% and an average particle size of 10 μm. The porosity of the prepared magnesia-based sintered body was lower than 1%, but at the SEM observation, an abnormal growth of particles was confirmed. The sintered body was disintegrated during the measurement of the hydrateability, and the weight increase could not be determined. It is considered that the reason for the disintegration of the sintered body was that the average particle size of the used ferric oxide was too large and an even texture was formed by an abnormal growth of particles.

The particle size distribution of the particles of this magnesia-based sintered body is shown in Table 4 and FIG. 2.

The particle size distribution was broader than that of the sintered body obtained in Example 3, and it is seen that the magnesia-based sintered body had an uneven composition.

COMPARATIVE EXAMPLE 3

A magnesia-based sintered body having a porosity lower than 1% was prepared by using only a magnesia powder obtained by the gas phase process, which powder had a purity higher than 99.9% and an average particle size of 0.01 μm. The hydrateability of the obtained magnesia-based sintered body was measured, and the results are shown in Table 1.

COMPARATIVE EXAMPLE 4

A magnesia-based sintered body was prepared in the same manner as described in Example 4 except that a magnesia powder obtained by the sea water process, which had an average particle size of 0.2 μm, was used. The corrosion resistance of the prepared magnesia-based sintered body was examined, and the results are shown in FIG. 1.

COMPARATIVE EXAMPLE 5

A magnesia-based sintered body was prepared in the same manner as described in Example 8 except that a magnesia powder obtained by the sea water process, which had an average particle size of 0.2 μm, was used. The hydrateability of the obtained magnesia-based sintered body was measured, and the results are shown in Table 1. The particle size distribution of the magnesia-based sintered body particles are shown in Table 6 and FIG. 2.

COMPARATIVE EXAMPLE 6

A magnesia-based sintered body was prepared in the same manner as described in Example 11 except that a magnesia powder obtained by the sea water process, which had an average particle size of 0.2 μm, was used. The hydrateability of the obtained magnesia-based sintered body was measured, and the results are shown in Table 1.

COMPARATIVE EXAMPLE 7

A magnesia-based sintered body was prepared in the same manner as described in Example 12 except that a magnesia powder obtained by the sea water process, which had an average particle size of 0.2 μm, was used. The hydrateability of the obtained magnesia-based sintered body was measured, and the results are shown in Table 1.

TABLE 6

| Particle Size Range | (Comparative Example 5) Additive: titania | | |
|---|---|---|---|
| | Number | Particle Size Distribution | Cumulation |
| 11–12 | 4 | 1.3 | 1.3 |
| 12–13 | 7 | 2.2 | 3.5 |
| 13–14 | 6 | 1.9 | 5.4 |
| 14–15 | 8 | 2.5 | 7.9 |
| 15–16 | 7 | 2.2 | 10.1 |
| 16–17 | 20 | 6.3 | 16.4 |
| 17–18 | 23 | 7.2 | 23.6 |
| 18–19 | 29 | 9.1 | 32.7 |
| 19–20 | 32 | 10.1 | 42.8 |
| 20–21 | 46 | 14.5 | 57.3 |
| 21–22 | 50 | 15.7 | 73.0 |
| 22–23 | 34 | 10.7 | 83.7 |
| 23–24 | 27 | 8.5 | 92.2 |
| 24–25 | 21 | 6.6 | 98.8 |
| 25–26 | 3 | 0.9 | 99.7 |
| 26–27 | 1 | 0.3 | 100.0 |
| | 318 | | |

Average size particle: 20.8 μm

We claim:

1. A magnesia-based sintered body of a homogeneous composition having a porosity lower than 1% and a hydrateability lower than 0.3%, the particle size distributions of the magnesia-based sintered body particles smaller than 22 μm comprising at least 99.3%, said sintered body having a chemical composition comprising 70 to 99.9% by weight of magnesia and 30 to 0.1% by weight of at least one other oxide wherein said other oxide is titanium oxide, aluminum oxide, ferric oxide, phosphorus pentoxide, yttrium oxide, barium oxide, boron oxide, calcium oxide or lithium oxide.

2. A magnesia-based sintered body as claimed in claim 1, wherein the oxide other than magnesia is contained in the form of a solid solution of said oxide and magnesia, independent particles having a particle size smaller than 3 μm or a reaction product of said oxide with magnesia.

3. A magnesia-based sintered body as claimed in claim 1, wherein the oxide other than magnesia is contained in an amount of 0.1 to 30% by weight in the case of titanium oxide, 0.1 to 1% by weight in the case of aluminum oxide, 0.1 to 10% by weight in the case of ferric oxide, 1 to 5% by weight in the case of phosphorus pentoxide, 1 to 30% by weight in the case of yttrium oxide, 1 to 10% by weight in the case of barium oxide, 10 to 20% by weight in the case of boron oxide, 1 to 10% by weight in the case of calcium oxide, and 10 to 15% by weight in the case of lithium oxide.

4. A process for the preparation of a magnesia-based sintered body, which comprises molding a powdery mixture comprising 70 to 99.9 parts by weight of a magnesia powder prepared by oxidizing a heated vapor of metallic magnesium in the gas phase, which has a purity higher than 99.9% and an average particle size smaller than 0.5 μm, and 30 to 0.1 parts by weight of a powder of at least one other oxide wherein said other oxide is titanium oxide, aluminum oxide, ferric oxide, phosphorus pentoxide, yttrium oxide, barium oxide, boron oxide, calcium oxide or lithium oxide, which has a purity higher than 99.9% and an average particle size smaller than 1 μm, and sintering the molded body at a temperature of 1400° to 1900° C.

5. A product produced by the process of claim 4.

* * * * *